Aug. 17, 1948.  W. WILDER ET AL  2,447,446
PATTERN CONTROLLED MACHINE TOOL
Filed March 23, 1944  5 Sheets-Sheet 1
Fig. 1
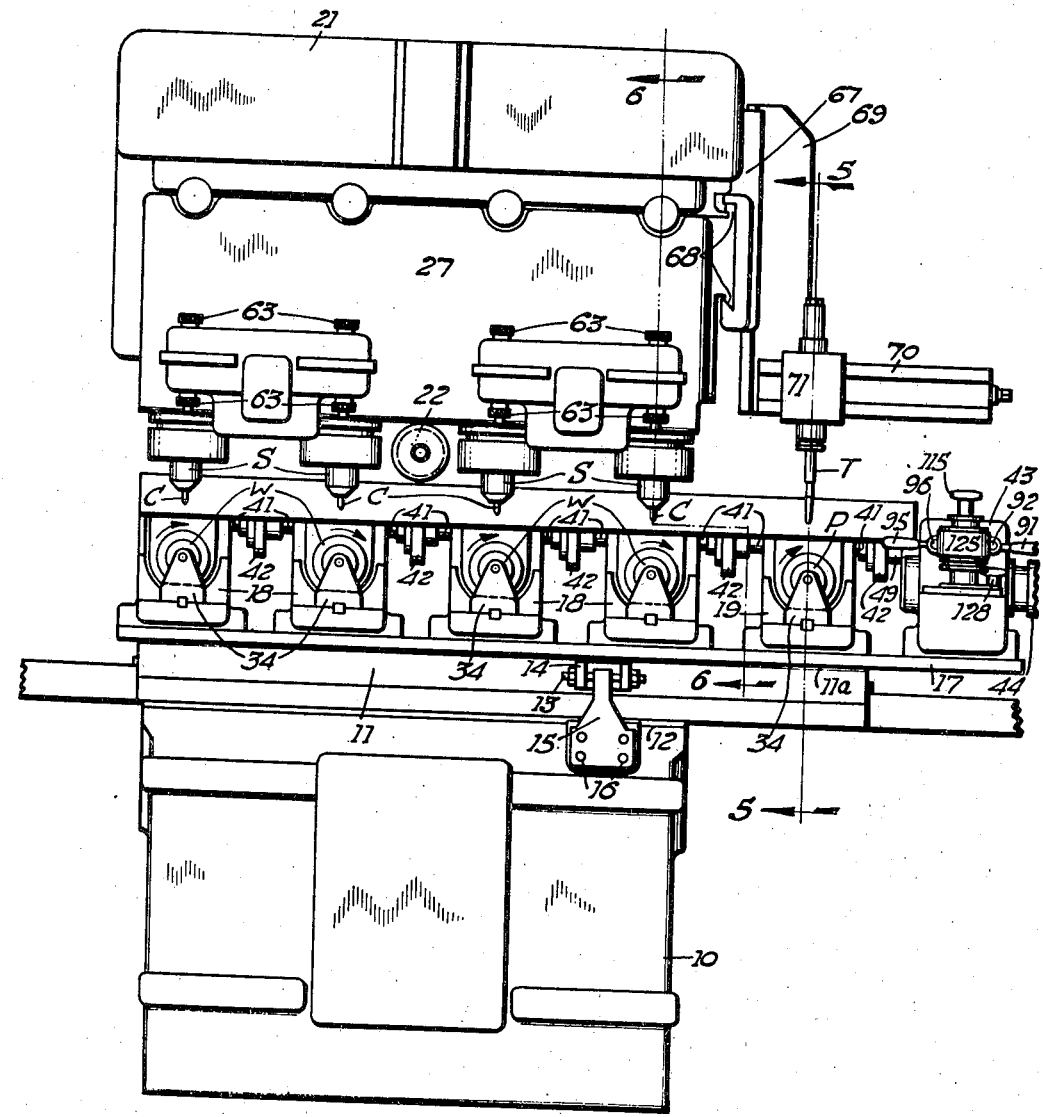
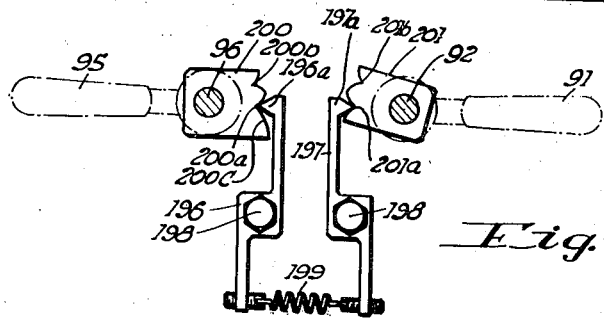
Fig. 4
INVENTOR.
WARREN WILDER
HERMAN HORLACHER
Leigh W. Wright
ATTORNEY.

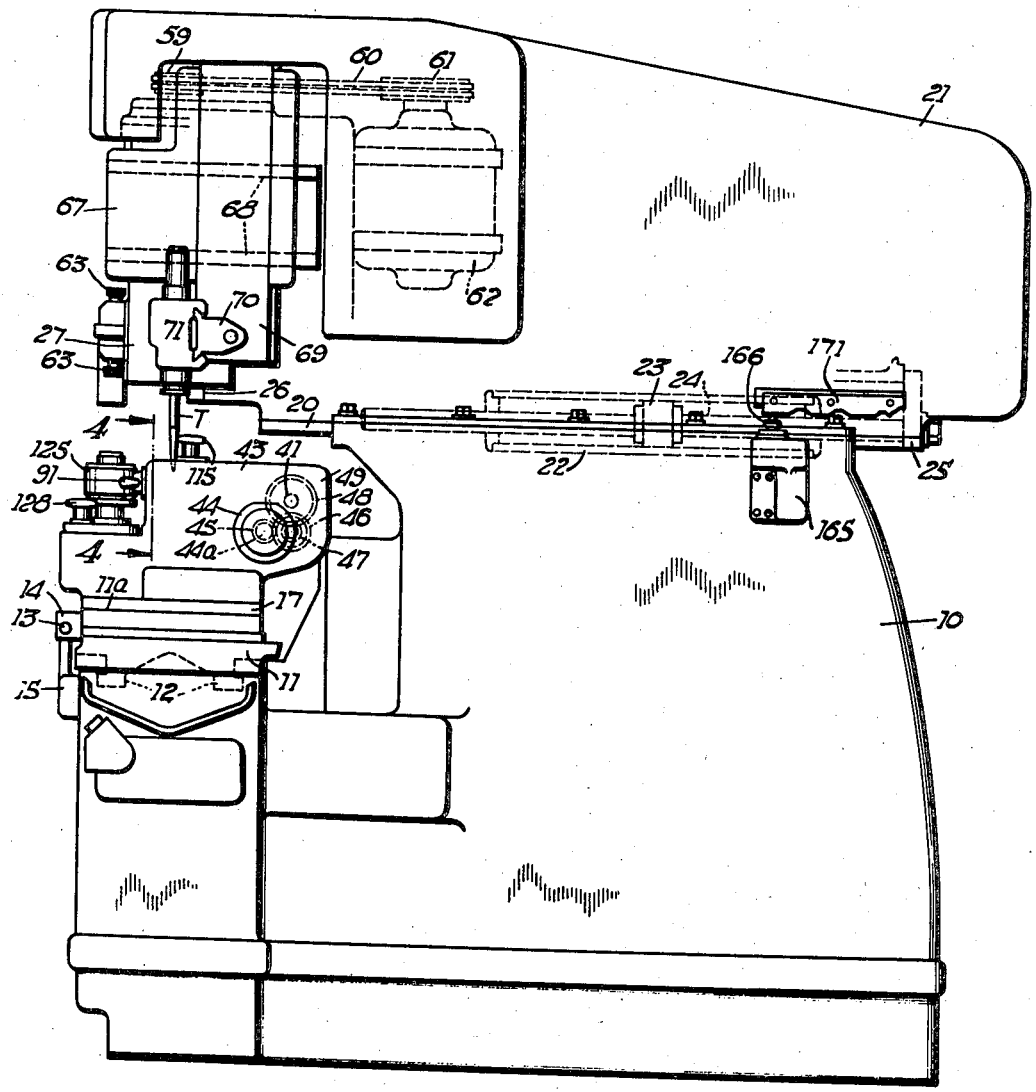

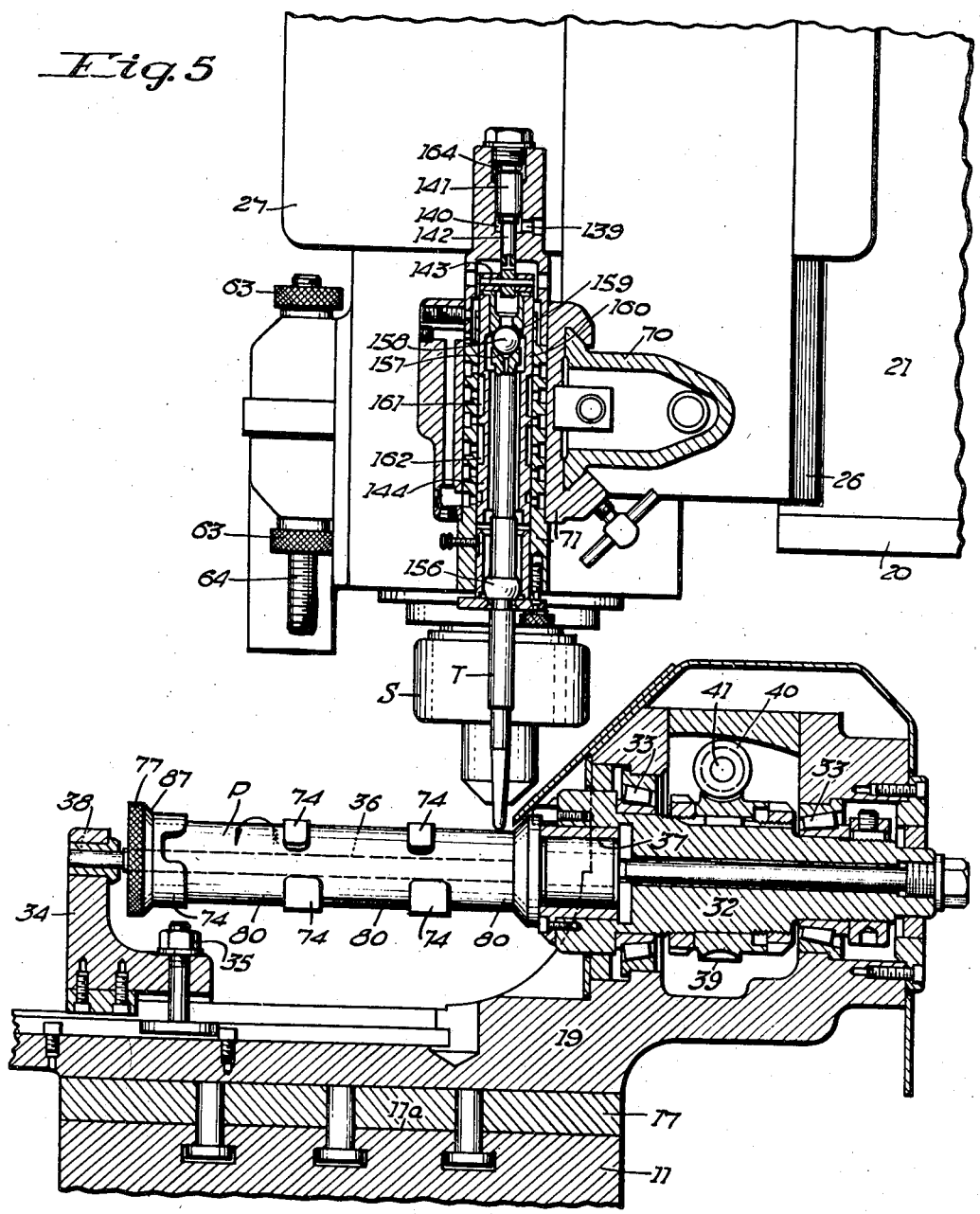

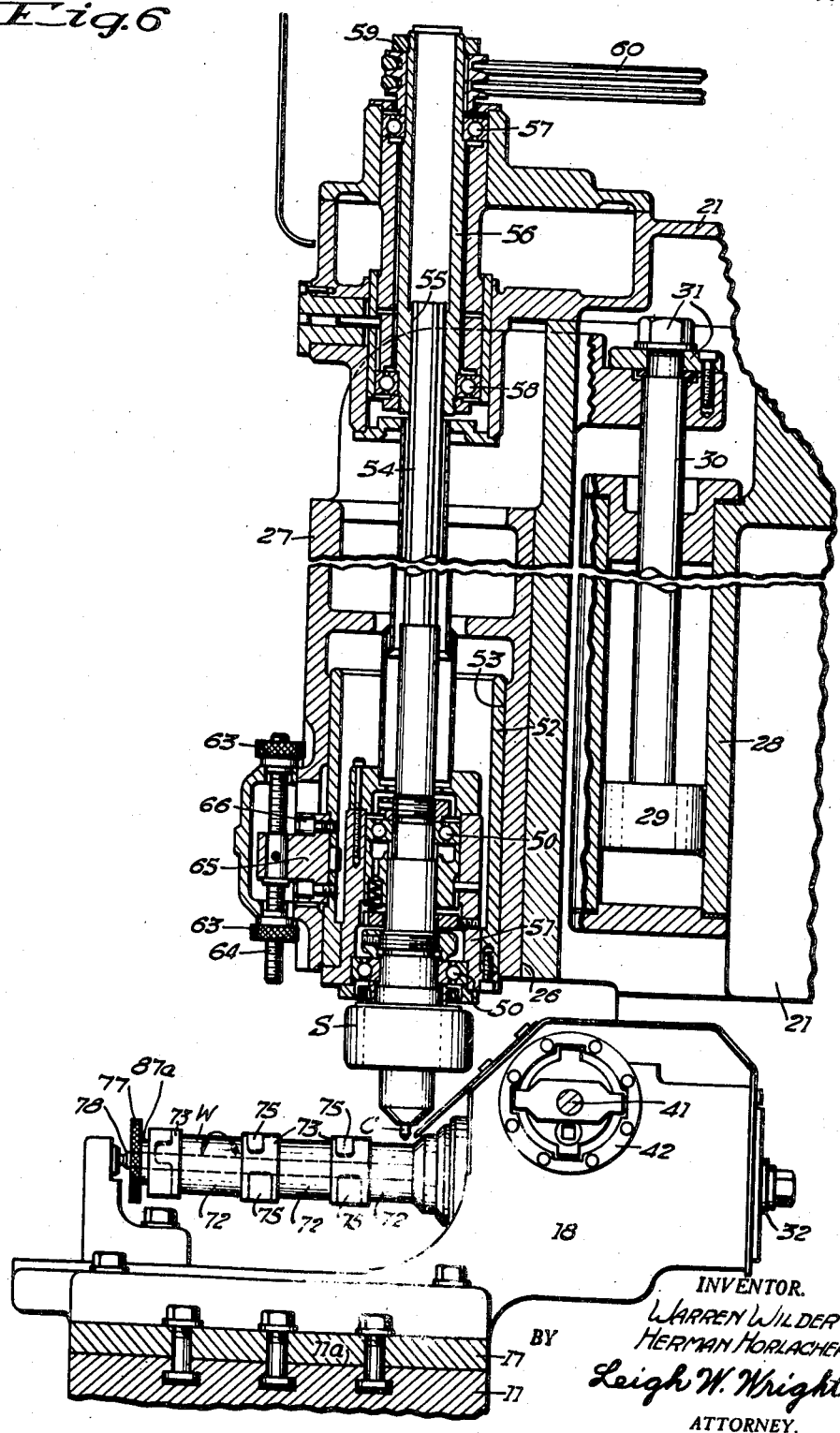

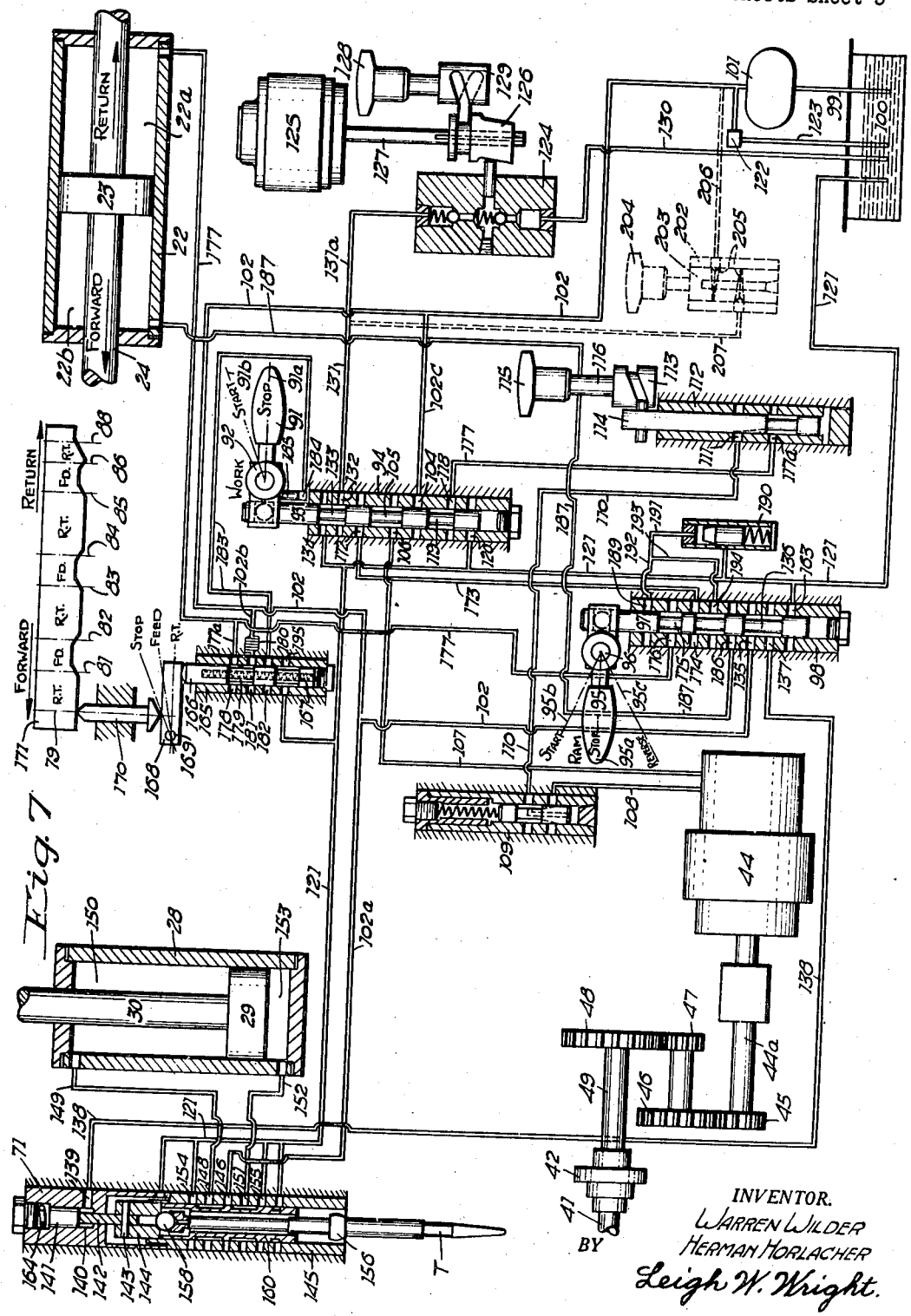

Patented Aug. 17, 1948

2,447,446

UNITED STATES PATENT OFFICE 2,447,446

PATTERN CONTROLLED MACHINE TOOL

Warren Wilder and Herman Horlacher, Cincinnati, Ohio, assignors to The Cincinnati Milling Machine Co., Cincinnati, Ohio, a corporation of Ohio Application March 23, 1944, Serial No. 527,792

18 Claims. (Cl. 90—13.4)

This invention relates to machine tools and more particularly to improvements in pattern controlled milling machines.

One of the objects of this invention is to provide an improved milling machine for automatically producing profile surfaces on the periphery of cylindrical work pieces from a pattern or master.

Another object of this invention is to provide an automatic pattern controlled milling machine for forming irregular profile shapes in spaced relation on the surface of cylindrical work pieces.

And another object is to provide, in combination with a mechanism for rotating a work piece with respect to a tool which is movable radially toward and from the axis of rotation of the work to vary the diameter thereof, a means for automatically effecting alternate relative axial feed and rapid traverse movements of work and tool during the machining cycle in accordance with the arrangement of axially spaced portions of the work piece.

And a still further object of this invention is to provide an improved fluid operating and control mechanism for an automatic pattern controlled milling machine.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a front elevational view, partly broken away, illustrating a multiple spindle pattern controlled milling machine incorporating the features of this invention.

Figure 2 is a right hand end elevational view of the machine shown in Figure 1.

Figure 3 is a diagram illustrating the character of the machining cycle performed by the machine.

Figure 4 is an enlarged fragmentary sectional view on the line 4—4 of Figure 2.

Figure 5 is a vertical transverse section on the line 5—5 of Figure 1 showing the relationship of pattern and tracer.

Figure 6 is a vertical transverse section on the line 6—6 of Figure 1 showing the relationship of work and cutter.

Figure 7 is a diagram showing the hydraulic operating and control circuit for the machine.

General machine arrangement

For illustrative purposes this invention is shown applied to a four-spindle pattern controlling milling machine comprising a main frame or column 10 upon the front portion of which is adjustably mounted the work table 11 by means of suitable guideways 12. Relative adjustment of the table 11 on the column 10 may be effected by means of the adjusting screws 13 carried in a bracket 14 fixed to the front face of the table 11 which engage a bracket 15 fixed to the column 10 by appropriate screws 16 as best seen in Figures 1 and 2. During the normal operation of the machine the set screws 13 rigidly lock the table 11 against relative movement on the ways 12 of the column 10.

On the top surface 11a of the table 11 is rigidly mounted a base plate 17 on top of which are rigidly fixed the rotary work holders or fixtures 18, which in this exemplary showing consists of four units for carrying the work pieces W and the rotary pattern holder or fixture 19 which carries the pattern P.

On the rear upper portion of the base or column 10 is mounted for transverse horizontal sliding movement on suitable guideways 20 the ram or cross slide 21 which may be actuated on the ways 20 by a suitable hydraulic cylinder 22 fixed to the column 10 in which operates a piston 23 carried on a piston rod 24 which projects outwardly from the cylinder 22 and is rigidly attached to the ram 21 by means of a suitable bracket 25.

On the front portion of the cross slide or ram 21 mounted on suitable guideways 26 is the vertically movable spindle and tracer carrier 27 which may be reciprocated up and down by means of a fluid pressure cylinder 28 in which operates a piston 29 having a piston rod 30 attached to the vertical spindle carrier 27 by means of a suitable nut and clamping collar 31. The spindle carrier 27 carries the four rotatable work spindles S and the tracer T. Thus, the general arrangement of the machine comprises a main base or column 10 upon which is carried a series of fixtures 18 and 19 for rotatably supporting the work pieces W and the pattern P and also on the column is mounted a horizontally movable cross slide or ram 21 which supports a vertically movable carrier 27 in which are mounted the rotatable cutter spindles S and the tracer T.

Rotary work and pattern holders

The detail structure of the rotary work holders 18 and the rotary pattern holder 19 are identical so that a description of one of these structures will suffice for the remaining structures. Referring particularly to Figure 5, wherein is shown a vertical transverse section through one of the work or pattern fixtures, it will be noted that there is provided a rotatable spindle 32 carried on suitable anti-friction bearings 33 in the fixture housing 19 or in the case of the work holders in the fixture housings 18. Also movable footstocks 34 are provided on the housings 18 and 19 which are locked in operating position by a suitable nut 35 which may be loosened to move the footstocks out of the way when loading or unloading the work W in the various fixtures 18 and in changing the pattern P in the fixture 19. The footstocks support the outer ends of the mandrels or arbors 36 which are supported in driving relationship in a suitable socket 37 in the work spindle 32 and in a suitable outboard bearing 38 in the footstocks 34 so that the spindle 32 rotates the mandrel and therefore the work W and pattern P. Each of the spindles 32 is driven by a worm wheel 39 fixed thereon and a worm 40 fixed on suitable shafts 41 journaled in the respective fixtures 18 and 19. All of the shafts 41 are suitably connected by universal joints or driving couplings 42 so that the spindles 32 in all of the fixtures 18 and 19 rotate in exact synchronism.

Also rigidly mounted on the base plate 17 is the main fixture drive and control housing 43 which carries the hydraulic driving motor 44 utilized to rotate the work and pattern fixtures 18 and 19 in synchronism. This hydraulic driving motor 44 has a pinion 45, Figures 2 and 7, on its main output shaft 44a which in turn, drives a gear 46 appropriately journaled in the housing 43 and which gear 46 is connected in coaxial driving relationship with a pinion 47 which drives a gear 48 carried on the output drive shaft 49 of the housing 43, the shaft 49 being connected through a coupling 42 to one of the shafts 41 in the pattern rotating fixture 19 so that the hydraulic motor 44 is thereby coupled to rotate the worms 40 and the meshing worm wheels 39 fixed on the spindles 32 in the fixtures 18 and 19.

Spindle and tracer carrier

The detailed mounting of the spindles S in the spindle and tracer carrier 27 is best shown in Figure 6. Each spindle S is journaled by means of suitable anti-friction bearings 50 carried in sleeve 51 fixed to the quill 52 slidably mounted in a bore 53 in the spindle carrier 27. The upper portion of the spindle S is provided with a spline portion 54 which operates in sliding driving relationship with a mating splined bore 55 formed in the driving sleeve 56 journaled against axial movement in bearings 57 and 58 in the cross slide or ram 21. To the upper portion of the driving sleeve 56 is fixed a pulley 59 over which operate belts 60 passing over a driving pulley 61 of a suitable prime mover or driving motor 62 as best seen in Figure 2. By means of the spline connection 54—55 the cutter spindles S may be continuously driven from the motor 62 for any vertical position of movement of the spindle carrier 27 on the ways 26 as effected by the hydraulic cylinder 28.

Accurate setting of each cutter spindle S with respect to the work W may be had by adjusting the quill 52 in the bore 53 by means of the adjusting nuts 63 operating on the adjusting screw 64 fixed to a bracket 65 attached to the quill 52 by suitable screws 66.

Also mounted on the carrier 27 is a tracer T, Figures 1, 2 and 5, by means of a bracket comprising a horizontal slide member 67 carried for appropriate transverse horizontal adjustment on guide ways 68 formed on the carrier 27. The member 67 carries a vertically movable bracket 69 appropriately mounted for vertical adjustment on the member 67. The member 69 in turn has an integral projecting guideway portion 70 extending horizontally normal to the guideways 68 upon which the tracer valve housing 71 is adjustably mounted. The object of the various bracket members 67, 69 and 70 is to provide a universal mounting to facilitate the accurate positioning of the tracer T relative to the work spindles S, the work W, and the pattern P.

Mode of operation

Referring particularly to Figures 3 and 6, it will be noted that the work piece W comprises a cylindrical body portion 72 upon which are located spaced irregular profile portions 73. These portions 73 are to be machined away in accordance with the portions 74 shown on the pattern P in Figure 5 so as to produce like machined portions 75 on the portion 73 of the work W. Because of the axially spaced nature of these portions 73 and in order to perform the profile machining operation on these portions in a most efficient, economical and rapid manner, it is necessary to make special provision to avoid feeding movements on portions of the work which require no machining and to thereby avoid cutting air during a major portion of the machining cycle.

A preferred cycle of operation of the machine in effecting the profiling operations on the work pieces W consists in continuously rotating the work pieces W and the pattern P by means of the hydraulic motor 44. At the start of the machining cycle the tracer T and the cutters C of the work spindles S are in the relative positions with respect to the pattern P and work pieces W as shown at position 76 in Figure 3. In this starting position 76 the tracer T and cutters C are to the rear of the work pieces W and pattern P and in an upward withdrawn position so as to facilitate placement and removal of the work pieces on the various work fixtures 18. After having appropriately loaded the unfinished work pieces in the machine by slipping the work W over the mandrels 36, Figure 6, the thumb nut 77 is tightened on the threaded portion 78 of the mandrel 36 securely against the work W. The footstocks 34 are then moved in to support the ends of the mandrels 36. The spindle carrier 27 is then actuated to bring the tracer and cutters down to the relative position shown at 79 in Figure 3. At this point the tracer T engages the main diameter portion 80 of the pattern P which it will be noted is slightly larger than the main diameter portion 72 of the respective work pieces so that there will be no contact of the cutters C with the surface portions 72 of the work pieces W.

Since there is no cutting action to take place until the cutter and tracer have moved from position 79 to position 81 this movement of work and cutter, and tracer and pattern is effected at a rapid traverse rate. When tracer and cutters reach the point 81, however, the profiling cutting must take place on the enlarged spaced portion 73 of the work pieces W so that further axial movement of cutter and tracer with respect to the work and pattern takes place at a feeding rate with the cutter and tracer having relative radial movement with respect to the work while effecting the profile cutting operations on the portion 73. This type of operation continues until the cutters and tracer arrive at the point 82 whereupon further cutting on the relieved portion 72 of the work W is not required so that again a rapid traverse movement is effected for the tracer and cutters until again a portion 73 to be machined is reached at the point 83. Again, while traveling over the position 84 the feed and vertical reciprocating profiling motion takes place. Again, rapid traverse motion is instituted from position 84 to position 85 where again from position 85 to position 86 the slow feed profiling movement again takes place. Finally, the tracer rides up on the beveled surface 87 provided on the knurled thumb nut 77 of the pattern supporting mandrel, Figure 5, to cause the cutters to withdraw from the work to the point 88. The knurled thumb nuts 77 on the work supporting mandrels have cutaway annular grooves 87a to permit the cutter C to run off of the work as they arrive at point 86. From the position 88 a rapid vertical withdrawal movement upwardly to the position 89 is provided for the carrier 27. The ram 21 is then actuated for rapid return movement along the line 90 to bring the tracer and cutter back to the initial starting position 76.

Thus, during the continuous rotation of the work pieces W and the pattern P by the fluid pressure motor 44 the tracer and cutter move axially of the work and pattern at alternate rapid traverse and feed rates of movement, with profiling motion taking place in a radial direction during the feeding movements, the feed and rapid traverse movements being instituted in accordance with the various spaced portions to be profiled on the work.

*Hydraulic operating and control mechanism*

The above cycle of operation of this machine is performed by hydraulic operating and control mechanism as best shown in Figure 7. The work and pattern rotation is started and stopped by means of the manual control lever 91 mounted on a suitable rock shaft 92 carried on the main drive and control housing 43 and is operatively connected to the plunger 93 of the work rotation start and stop control valve 94. The control of the rapid traverse and feeding movements is obtained by means of the manual control lever 95 also mounted on an appropriate rock shaft 96 mounted in the housing 43 and which lever is operatively connected to the plunger 97 of the feed and rapid traverse control valve 98.

As shown in Figure 7, both of the control valves 94 and 98 are in the stop position so that work and pattern rotation is stopped and there is no relative feeding of the cutters and tracer with respect to the work and pattern taking place. In order to put the machine in operation the control lever 91 is moved from the stop position 91a to the start position 91b whereupon fluid withdrawn through the intake line 99 from the reservoir 100 is transmitted under pressure by means of a suitable hydraulic pump 101 through the pressure line 102 and the branch pressure line 102c connected to the port 104 of the control valve 94 which is now brought in communication with the annular groove 105 of the plunger 93.

Fluid pressure from pump 101 is thus connected to a port 106 of the valve 94 and through the line 107 to the hydraulic motor 44 to cause it to rotate and thereby drive the work pieces and pattern. Exhaust from the hydraulic motor 44 passes through the line 108 through the pressure reducing and regulating valve 109 to effect proper operation of the motor 44, and then through the line 110 which is connected to the port 111 of the adjustable throttle valve 112 which may be regulated by means of the cam 113 which moves the plunger 114 of the valve 112 to appropriately regulate the orifice at the port 111 and thereby regulate the escape of discharge fluid from the motor 44 to govern its desired speed. A suitable control knob 115 carried on a shaft 116 journaled in the housing 43 serves to provide manual control means for adjusting the valve 112 and therefore the speed of rotation of the hydraulic motor 44 and the work W and pattern P. Discharge from the throttle valve 112 at this time passes out through port 117a, the line 117, the port 118 of the control valve 94 which at this time is connected through the annular groove 119 of the valve plunger 93 to the drain or exhaust port 120 in the valve 94 which communicates with the drain line 121 for returning the fluid to the reservoir 100. When the lever 91 is moved back to the stop position 91a under these conditions, as shown in Figure 7, the port 104 is blocked off from the pressure in line 102 and line 102c coming from the pump 101 and also the port 118 is closed from connection with the exhaust port 120. The hydraulic motor 44 is thereby locked against rotation. Thus by moving the lever 91 alternately from position 91a to position 91b and back again the work carriers and pattern may be started or stopped, or jogged in rotary movement for examination of the work being done.

The pump 101 is protected from excessively high back pressure in the line 102 by means of a suitable pressure relief valve 122 exhausting through a drain line 123 back into a reservoir 100 when the port 104 is closed off or any other positive obstruction is provided in the line 102. This pump 101 serves as the chief source of the large volume fluid flow through line 102 for effecting rapid traverse movements in the cross slide or ram 21.

There is also provided a variable delivery high pressure feed pump 124 indicated diagrammatically in Figure 7 which is driven by a suitable electric motor 125 mounted in the housing 43 which rotates an eccentric actuating cam 126 adjustable axially of the shaft 127 of the motor 125 by means of a control knob 128 which may be manually operated to rotate the control cam 129 so as to vary the rate of fluid pressure delivery of the pump 124. This pump 124 derives its source of fluid from the tank 100 through the intake line 130 and transmits the high pressure feeding fluid through line 131a and line 131 connected to the port 132 of the control valve 94. It will be noted that when the control lever 91 is in the stop position 91a that the port 132 communicates through the annular groove 133 of the valve plunger 93 with an exhaust port 134 connected to the atmospheric drain line 121 for return of fluid to reservoir 100 so that there is no operation of the high pressure pump 124 under pressure when work rotation is stopped and the machine is idle.

When the control lever 91 is moved to the work rotating or start position 91b the motor 44 will be operating as described above at the desired rate as adjusted by means of the control knob 115. At this time with the control lever 95 of the valve 98 in the stop position 95a, Figure 7, fluid pressure from the line 102 will be transmitted to the pressure port 135 of the valve 98 and is connected by means of the annular groove 136 in the valve plunger 97 to the port 137 of the valve 98 from which pressure is delivered through the line 138 to the port 139 of the tracer valve body 71, this port 139 being in communication with the lifting cylinder 140 in which operates the piston 141 connected by a suitable rod 142 and linkage connection 143 with the operating plunger or sleeve 144 of the tracer control valve, indicated generally at 145, thus holding the tracer in its extreme upward position.

The tracer control valve 145 has a pressure port 146 which is supplied by means of a branch line 102a from the main pressure line 102 and the valve has a port 148 communicating through a line 149 with the upper chamber 150 above the piston 29 of the vertical spindle carrier actuating cylinder 28 and has a port 151 communicating through a line 152 with the lower chamber 153 of this cylinder. Exhaust ports 154 and 155 are also provided in the valve 145 and are connected to the drain line 121 for return of fluid to the reservoir 100.

The tracer is of conventional design and is shown in detail in Figure 5 having a tracer stem T which is universally mounted by suitable ball and socket arrangement indicated at 156 and provided at its upper portion with a conical depression 157 in which is mounted an actuating ball 158 which engages a mating conical depression 159 formed in the tracer valve sleeve 144. This sleeve may thus be axially reciprocated in the valve 145 by both radial and axial displacement of the tracer finger T. The sleeve 144 is provided with annular grooves 161 and 162 so positioned relative to the pressure port 146, cylinder ports 148 and 151, and exhaust or drain ports 154 and 155 that axial reciprocation of the valve sleeve 144 effects reversal of the piston 29 in the cylinder 28 in response to the actuation of the tracer by the configurations 75 on the pattern P.

Thus when the control valve 98 has its control lever in the stop position 95a with pressure applied in the chamber 140 of the tracer valve 71 below the lifting piston 141, the tracer valve sleeve 144 will be held upwardly so as to cause continuous application of pressure in the chamber 153 of the cylinder 28 to thereby hold the spindle carrier 27 in its upward position with the tracer T and cutter C, held in the position 76, Figure 3.

With the work and pattern rotating, the control lever 91 of the valve 94 is in the start position 91b. The control lever 95 of the valve 98 may be moved to its start position 95b whereupon the fluid pressure in the chamber 140 under the piston 141 holding up the tracer valve sleeve 144 and its tracer T is relieved by connecting this pressure from the line 138 through the port 137 of the valve 98 to the exhaust port 163 which is connected to the return or drain line 121 through the annular groove 136 of the valve stem 97. At the same time the pressure line 102 coming into the pressure port 135 of the valve 98 is blocked off by movement of the valve plunger 97. Thus, under the influence of the spring 164 the tracer T is moved downward to its no contact or undeflected position, moving the sleeve 144 so as to apply pressure in the upper chamber 150 of the cylinder 28 causing the spindle carrier 27 to move downwardly bringing the cutters C and tracer T in contact with the pattern P as shown at 79 in Figure 3. Whereupon the tracer is deflected to its normal tracing position, stopping further downward vertical movement of the carrier 21 and positioning the cutter and tracer in readiness for the horizontal axial relative movement of the work and cutter for the profiling operation on the work W.

Referring again in Figure 3 it will be noted that the main cylindrical body portion 88 of the pattern P is slightly larger than the cylindrical surface 72 of the work so that this portion will not be contacted by the cutter C during the cutting operation. Since it is unnecessary to perform any machining operation on the portions 72 it is desirable to effect a rapid horizontal axial traverse of the cutters past these spaced portions to bring the cutters promptly to the spaced portion 73 of the work upon which the actual machining is to be done. An automatic control mechanism is provided for intermittently applying rapid traverse and feed movements to the ram or cross slide 21 to obtain these results. Referring to Figures 2 and 7, this apparatus comprises the automatic feed and rapid traverse control valve 165 mounted rigidly on the column 10 having a plunger 166 which may be depressed to a series of three positions for effecting rapid traverse, feed, and stopping of the horizontal movement of the ram 21 during the machining operation. The valve plunger 166 is normally urged upwardly, Figure 7, by means of a compression spring 167 against an actuating arm 168 carried on a suitable pivot 169 in the valve 165. This arm 168 is actuated by a suitable cam engaging plunger 170 slidably mounted in the valve 165 and engaging a control cam 171 rigidly attached to and carried by the ram 21 as best seen in Figure 2. This cam has a series of elevated portions 79—81, 82—83, 84—85, and 86—88 for so depressing the plunger 170 as to effect rapid traverse movement of the ram, these portions corresponding to the portions of the work and pattern indicated by the same reference numerals in Figure 3. Also, a series of depressed feed portions 81—82, 83—84 and 85—86 are provided on the cam for moving the plunger 170 to effect feed movements in the ram 21 corresponding to the same portions indicated in Figure 3. The final depressed position 88 is for permitting the full upward positioning of the plunger 166 so as to stop the feed movement of the ram in its outward movement toward the front of the machine.

With the ram in the rearward position and the cutters C and tracer T having moved downwardly to the position 79 as indicated in Figure 3, the valve plunger 166 is fully depressed to the rapid traverse position, Figure 7. At this time the control valve 94 has its lever 91 in the start position 91b and the control valve 98 has its lever 95 in the start position 95b. Fluid pressure from the high pressure feed pump 124 is transmitted through line 131a and line 131 to the port 132 of valve 94, through the annular groove 133 of its valve stem 93 to the pressure outlet port 172 while the port 134 of the valve 94 is closed off. Pressure from the port 172 then passes through the line 173 to the port 174 of the valve 98 and then through the annular groove 175 of its valve stem 97 to the port 176, from which it passes through the line 177 to the forward actuating chamber 22a of the ram actuating cylinder 22 thus to effect the forward horizontal feeding movement of the ram. During rapid traverse movements fluid delivery from the pump 101 supplements the fluid delivery of the high pressure feed pump. To accomplish this a branch line 177a of the line 177 is connected to the port 178 of the feed and rapid traverse control valve 165 which is in communication with the annular groove 179 of the valve stem 166. The pump 101 transmits flow through the line 102b of the pressure line 102 through the fluid pressure control resistance 180 to the port 181 of the valve 165 which port at this time is also in communication with the annular groove 179 of the valve plunger 166 so that its flow passes out through the line 177a to the line 177, supplementing the flow of the pump 124 therein to effect a rapid movement of the piston 23 in the cylinder 22 for moving the ram at rapid traverse movement from position 79 to position 81, Figures 3 and 7.

As soon as the cam 171 is carried by the ram 21 with its position 81 aligned with the plunger 170, the plunger moves upwardly, Figure 7, permitting the plunger 166 of valve 165 to move under the influence of the spring 167 to close off the port 181 of valve 165 from the large volume flow of line 102b and the pump 101 with the result that the feed pump 124 then supplies the entire volume for moving the piston 23 at a feeding rate. This feeding movement continues from the point 81 to the point 82 where again the plunger 166 is depressed to its rapid traverse position. It is obvious this alternate functioning of feed and rapid traverse continues in response to the shape of the cam 171 for the various positions of feed and rapid traverse recited above.

When the ram 21 finally moves the cam to bring the point 86 in alignment with the plunger 170, the valve plunger 166 will be moved under the influence of the spring 167 to a position such that the port 178 connected to the line 177a of the valve 165 will be closed off. The port 181, receiving its fluid supply from the pump 101, will then be connected to a port 182 to which is connected a line 183 communicating with an actuating or trip cylinder 184 having an actuating plunger 185 engaging the control lever 91 in such a way that when the pressure is applied in the trip cylinder 184 it will move the control lever from the start position 91b back to the stop position 91a and thereby close off flow from the high pressure feed pump 124 from communication with the port 172 of the valve 94 and connect the feed pump 124 to the drain line 121 through the port 134 of the valve 94, thus bringing the piston 23 and the ram 21 to a stop at the point 88. During this final portion of the feeding from point 86 to point 88 the tracer T, Figure 3, rides up on the beveled surface 87 of the pattern so as to automatically initially withdraw the cutters from the work when the feed motion stops.

As soon as the feeding motion of the ram 21 is thus brought to a stop the operator then moves the control lever 95 of the valve 98 from the start position 95b to the reverse position 95c whereupon pressure from the pump 101 and the line 102 communicating with the port 135 of valve 98 is connected through the annular groove 136 of its plunger 97 with the port 137 which communicates through the line 138 with tracer elevating cylinder 140 to thereby raise the tracer to its extreme overdeflected position to thus cause the spindle carrier 27 to move upwardly from the position 88 to the position 89, Figure 3. With the valve 98 in the position 95c, pressure from the port 135 is communicated through channel 136 to the port 186 which communicates through a line 187 with the return chamber 22b of the cylinder 22 whereby fluid flow from the pump 101 is connected thereto to effect a rapid return movement of the ram back to the position 79. The cutters and tracer travel along a path 90 as indicated in Figure 3, removed upwardly from the work, the spindle carrier being thus held up by the fluid pressure in line 138 maintained therein from the annular groove communicating at port 137. At the same time discharge from the forward feeding portion 178 of the cylinder 22 passes through the line 177 to the port 176 of the valve 98 where it communicates with a discharge port 189 through the annular groove 175 of its plunger 97.

A small back pressure is maintained against the discharge flow out of either end of the cylinder 22 provided by the low pressure relief valve 190 which is connected by a line 191 and 192 to the port 189 for receiving the outward flow from the discharge end of the cylinder 22 during the reverse movement of the ram and this valve 190 is connected through line 191 and 193 to a discharge port 194 of the valve 98 which is in communication with the port 186 and the line 187 during the forward movement of the ram. Discharge from the valve 190 passes to the drain line 121. The fluid resistance 180 in the line 102b connected to the feed and rapid traverse control valve 165 functions during the forward rapid traverse movement to limit the inflow to line 177 and the forward actuating chamber 22a of the ram cylinder from the pump 101 so as to regulate the rate of forward rapid traverse movement to a desired speed. The fluid resistance 180 also serves to prevent high fluid pressure from the line 102b from the pump 101 from entering the line 177a and thus oppose the fluid discharging from the cylinder 22 through the line 177 during the reverse rapid traverse movement as the control valve plunger 166 is depressed to rapid traverse positions by the cam 171 during return movement of the ram. It is apparent that the flow from the line 102b is momentarily connected from the line 102b and the pump 101 during the return movement from points 85—84, 83—82, 81—79 so that the resistance 180 effects a pressure drop to maintain higher pressure in line 177 than in line 102b to thereby prevent excessive back pressure from interfering with the normal return movement of the piston 103 in the cylinder 102. As the ram rapid traverses backwardly and the valve 166 is actuated the control line 183 for the actuating trip cylinder 185 for the control lever 91 is connected to the drain line 121 through the port 195 of the valve 165 so as to permit manual operation of the control lever 91 to the start position after the ram 21 has returned to its rearward initial starting position.

The control levers 91 and 95 may be held in their respective operative positions by appropriate detent mechanism shown in Figure 4 comprising a pair of detent latches 196 and 197 appropriately mounted on pivot pins 198 carried in the housing 43, and normally urged outwardly by a tension spring 199 against the detent cam 200 of the control lever 95 and 201 of the control lever 91. It will be noted in connection with the control lever 91 and its detent cam 201 that there have been provided two detent notches 201a and 201b which may be engaged by the point 197a of the detent arm 197 corresponding to the respective stop position 91a and start position 91b of the lever 91. The detent cam 200 of the lever 95 is provided with two positioning detent notches 200a and 200b corresponding to the stop position 95a and the start position 95b of the lever 95. A third position comprising a cam surface 200c and corresponding to the reverse position 95c is so arranged that when engaged by the point 196a of the detent arm 196 it will normally urge the handle 95 to the stop position 95a so that the operator must continuously hold the lever 95 in the reverse position 95c and upon release of the handle it will automatically return to the stop position 95a.

As an alternate method of obtaining the fluid supply for the feeding motion the feeding pump 124 and its associated motor and control mechanism may be eliminated and in place thereof a suitable flow control valve 202 substituted, Figure 7, having a rotatable plunger 203 operated by a control knob 204 which is equivalent in function to the control knob 128 for the pump 124. This valve has adjustable restricting ports 205 for regulating the flow through the line 206 from the pump 101 into the line 207 which may be connected to the line 131 to function in the same fashion as the line 131a coming from the high pressure pump 124. Thus, in the latter structure the common pump 101 performs both the feed and rapid traverse movements, the feed being regulated by the control valve 202, in which case the entire arrangement comprising the high pressure pump 124, the intake line 130, and the output line 131 up to the point of its juncture with the line 207 is not required.

*Summary of machine operation*

After having properly mounted the pattern P in the fixture 19 and placed rough work pieces W in the fixtures 18, the operator moves the control lever 91 of the work rotation control valve 94 from the stop position to its start position, thus starting rotation of the work and pattern. The control lever 95 of the feed control valve 98 is then moved from stop position to the start position whereupon cutters and tracer are brought down into cutting relationship with the work and pattern and begin to move forward at rapid traverse movement axially of the rotating workpieces and pattern. This motion of cutters and tracer is effected at alternate rapid traverse and feeding motion in accordance with the configuration of the work by the control cam 171 and its associated cam controlled valve 165. This motion of the cutters, in conjunction with the continuous rotation of the work, effects a spiral or helical path of travel of the cutters around the periphery of the spaced portions machined on the work piece. After the forward movement of the cutters and tracer has been completed, the cam controlled valve 165 automatically trips the lever 91 of the control valve 94 to its stop position which stops the forward feeding motion and work and pattern rotation by connecting the feed pump to reservoir and blocking the supply and return lines of the work motor. At this time the control lever 95 of valve 98 is still in its start position and now becomes ineffective due to the tripping of the valve 94 back to its stop position. The control valve 98 is now manipulated from its start position to the reverse position which initiates the rapid traverse return of the ram to its rearward initial starting position and the upward withdrawal of the spindle and tracer carrier 27.

With the feed control valve 98 in its stop position the work rotation control valve 94 may be operated to either of its positions for effecting the rotation or stopping of rotation of the work and pattern. When the feed control valve 98 is positioned in the start position manipulation of the work rotation control valve 94 may be used to effect the simultaneous stopping or starting of work rotation and feed of the ram. Thus, with the control valve 98 in the start position the control valve 94 may be moved to a stop position at any time during the forward cycle to stop both work rotation and feed for inspection of the machining operation. Whether or not feed or rapid traverse motion will be arrested or reinitiated by thus operating the control valve 94 with the valve 98 in the start position will depend upon the position of the cam 171 in relation to the cam controlled valve 165.

The cam controlled valve 165 is effective when the ram has completed its forward motion to automatically trip the valve 94 to stop position while the valve 98 is in the start position which thereby automatically stops both the work rotation and the forward feed or rapid traverse motion of the ram while rendering the valve 98 ineffective when still in its start position. The valve 98 may be manipulated at any time from either the start position or the stop position to the reverse position to automatically rapidly raise the cutters and tracer from the work and pattern and rapidly withdraw the ram rearwardly to its initial starting position to thereby quickly disengage cutters from the work and the tracer from the pattern in the event of accident or mechanical difficulty. It is also to be noted that when the control valve 94 is in start position the feed may be stopped and started, subject to the feed or rapid traverse control position of the valve 165, by manipulating the lever of the control valve 98 to the start or stop position to thereby engage or disengage feeding motion while continuing rotation of the work and pattern.

There has thus been provided in a pattern controlled milling machine an arrangement for forming irregular profile shapes on axially spaced peripheral portions of rotating cylindrical workpieces while relative axial rapid traverse and feeding movements are effected in the cutter and tracer with respect to the work and pattern; the rapid traverse and feeding movements being automatically effected in accordance with the arrangement of the portions to be profiled on the workpiece. And there is thus provided in a pattern controlled milling machine, a hydraulic control mechanism for automatically rendering feed and rapid traverse movements effective in accordance with the nature of the work piece in an intermittent alternate series of movements and wherein manual control means is provided for at any time stopping work and pattern rotation or reversing the feeding movements of the cutters and tracer during the machining cycle; and wherein a plurality or a single fluid pressure source may be utilized for effecting the rapid traverse and feeding movements of the tracer and cutters.

What is claimed is:

1. In a pattern controlled milling machine, a column, means on said column for rotatably supporting a pattern and work piece, a cross slide mounted on said column for movement parallel to the axis of rotation of said pattern and work, a vertically movable slide mounted on said cross slide, a tracer and a rotatable cutter spindle mounted on said vertically movable slide, means for rotating said pattern and work piece, means for actuating said cross slide, means for reciprocating said vertical slide, a control means for stopping and starting said rotating means for said pattern and work piece, a control means for the actuating means for said cross slide, and means whereby said tracer controls the reciprocating means for the vertically movable slide, and means whereby when the control means for the cross slide actuating means is operative said control means for the pattern and work rotation is rendered effective for simultaneously stopping and starting pattern and work rotation and controlling the stopping and starting of the cross slide movement.

2. In a pattern controlled milling machine, a column, means on said column for rotatably supporting a pattern and work piece, a cross slide mounted on said column for movement parallel to the axis of rotation of said pattern and work, a vertically movable slide mounted on said cross slide, a tracer and a rotatable cutter spindle mounted on said vertically movable slide, means for rotating said pattern and work piece, means for actuating said cross slide, means for reciprocating said vertical slide, a control means for stopping and starting said rotating means for said pattern and work piece, a control means for the actuating means for said cross slide, and means whereby said tracer controls the reciprocating means for the vertically movable slide, means whereby when the control means for the cross slide actuating means is operative said control means for the pattern and work rotation is rendered effective for simultaneously stopping and starting pattern and work rotation and controlling the stopping and starting of the cross slide movement, and means operable by the movement of said cross slide to automatically effect variations in the rate of movement of the cross slide and to stop movement thereof in accordance with the axial configuration of the work piece being machined.

3. In a pattern controlled milling machine having a column, rotatable pattern and work fixtures mounted on said column, fluid pressure means for rotating said fixtures, a cross slide mounted for horizontal transverse movement on said column in a direction parallel to the axis of rotation of said pattern and work, fluid pressure means for actuating said cross slide, a tracer controlled cutter spindle on said cross slide adapted for radial relative movement with respect to the axis of rotation of said pattern and work fixtures, fluid pressure control means for starting or stopping rotation of said fluid pressure fixture rotating means, a second fluid pressure control means for stopping and starting movement of said fluid pressure actuating means for said cross slide, said last-mentioned control means having a start position for effecting forward movement of said cross slide, a stop position, and a reverse position for effecting reverse movement of the cross slide, and means whereby said first-mentioned control means is effective to simultaneously stop and start rotation of said pattern and work fixtures and the forward motion of said cross slide when said second-mentioned control means is in its start position.

4. In a pattern controlled milling machine having a column, rotatable pattern and work fixtures mounted on said column, fluid pressure means for rotating said fixtures, a cross slide mounted for horizontal transverse movement on said column in a direction parallel to the axis of rotation of said pattern and work, fluid pressure means for actuating said cross slide, a tracer controlled cutter spindle on said cross slide adapted for radial relative movement with respect to the axis of rotation of said pattern and work fixtures, fluid pressure control means for starting or stopping rotation of said fluid pressure fixture rotating means, a second fluid pressure control means for stopping and starting movement of said fluid pressure actuating means for said cross slide, said last-mentioned control means having a start position for effecting forward movement of said cross slide, a stop position, and a reverse position for effecting reverse movement of the cross slide, means whereby said first-mentioned control means is effective to simultaneously stop and start rotation of said pattern and work fixtures and the forward motion of said cross slide when said second-mentioned control means is in its start position, and means whereby said second-mentioned control means may be operated at any time to its reverse position to effect rearward movement of said ram irrespective of any position of said first-mentioned control means.

5. In a pattern controlled milling machine, a column, a rotary pattern holder, a rotary work holder, means for driving said holders in synchronous rotation, a transversely movable ram adapted for movement parallel to the axis of rotation of said pattern and work holders, means for actuating said ram in said transverse movement, a control means for said synchronous driving means for stopping or starting pattern and work holder rotation, a second control means for rendering the actuating means for said ram operative or inoperative, and a third rate changing control means operable by the movement of said ram to effect a change in rate of the forward movement of said ram in accordance with the configuration of the work being machined, said last-mentioned rate changing control means being rendered operative when the said first-mentioned control means is positioned to effect rotation of the pattern and work holders and when the second-mentioned control means is positioned to effect the forward movement of said ram, and means whereby said rate changing control means is effective, at the end of the forward travel of said ram, to automatically actuate said first-mentioned control means to stop rotation of said pattern and work holders and arrest further forward movement of said ram.

6. In a pattern controlled milling machine, a column, a rotary pattern holder, a rotary work holder, means for driving said holders in synchronous rotation, a transversely movable ram adapted for movement parallel to the axis of rotation of said pattern and work holders, means for actuating said ram in said transverse movement, a control means for said synchronous driving means for stopping or starting pattern and work holder rotation, a second control means for rendering the actuating means for said ram operative or inoperative, and a third rate changing control means operable by the movement of said ram to effect a change in rate of the forward movement of said ram in accordance with the configuration of the work being machined, said last-mentioned rate changing control means being rendered operative when the said first-mentioned control means is positioned to effect rotation of the pattern and work holders and when the second-mentioned control means is positioned to effect the forward movement of said ram, means whereby said rate changing control means is effective, at the end of the forward travel of said ram, to automatically actuate said first-mentioned control means to stop rotation of said pattern and work holders and arrest further forward movement of said ram, and means whereby said second control means may be operated at any time, to effect rapid return movement of said ram to its initial rearward starting position.

7. In a pattern controlled milling machine, a column, rotatable pattern and work holders mounted thereon, fluid pressure means for rotating said pattern and work holders in synchronism, a cross slide mounted for movement on said column parallel to the axis of rotation of said pattern and work holders, fluid pressure means for actuating said cross slide, a vertically reciprocable spindle and tracer carrier mounted on said cross slide, a cutter spindle journaled in said carrier, a tracer mounted on said carrier adapted to engage said pattern to effect relative radial movement of said cutter and work, a control means for starting or stopping rotation of the fluid pressure means for rotating said pattern and work holders, a control means for the fluid pressure actuating means for said ram to effect stopping, forward, and reverse movements in said ram, means whereby when said second-mentioned control means for the ram movement is in a stop position the control means for pattern and work holder rotation is solely effective to stop and start rotation thereof, means effective when said second-mentioned control means is in stop position to cause said tracer to be actuated by means other than the pattern to effect upward positioning of said spindle carrier away from said pattern and work holders, means whereby when said second-mentioned control means is moved to a position to effect forward movement of said cross slide, said first-mentioned control means will be rendered effective to simultaneously stop and start rotation of said pattern and work holders and effect stopping and starting of the forward movement of said ram, and means associated with said second-mentioned control means whereby said spindle and tracer carrier is automatically moved downwardly to working position when said second-mentioned control means is moved to a position to effect forward movement of said ram.

8. In a pattern controlled milling machine, a column, rotatable pattern and work holders mounted on said column, fluid pressure means for rotating said pattern and work holder in synchronism, a control means for stopping or starting rotation of said fluid pressure rotating means, a cross slide mounted on said column for movement parallel to the axis of rotation of said pattern and work holder, fluid pressure means for actuating said cross slide, fluid pressure control means for said actuating means operable to one position to stop movement of said cross slide, operable to a second position to effect forward movement of said cross slide, and operable in a third position to effect return movement in said cross slide, a tracer controlled spindle carrier mounted on said cross slide for radial movement relative to the pattern and work holders, a tracer and a rotary cutter spindle on said carrier respectively engageable with a pattern and work in said holders, a rate varying control means for the cross slide actuating means operable by the movement of said ram for changing the rate of relative movement thereof at spaced intervals axially of the pattern and work, means whereby when said second-mentioned control means for the forward movement of said ram is operated to effect forward movement thereon said rate varying means is rendered operative, means whereby said rate varying means automatically renders said second-mentioned control means inoperative at the completion of the forward movement of said cross slide, and means whereby said second-mentioned control means is effective at all times to effect reverse movement in said cross slide independent of said rate varying control means.

9. In a pattern controlled milling machine, a column, rotary pattern and work holding means mounted on said column, fluid pressure driving means for rotating said rotary pattern and work holding means in synchronism, a ram on said column adapted for movement parallel to the axis of rotation of said pattern and work holding means, a spindle carrier mounted for vertical movement on said ram, rotary cutter spindle means in said carrier, driving means on ram for rotating said spindle means for any position of relative movement of said carrier on said ram, a tracer mounted on said carrier, a fluid pressure means for actuating said carrier in vertical movement in accordance with the effect of said pattern on said tracer during rotation of said pattern and work holding means and the axial movement of said ram relative to said pattern and work, fluid pressure means for actuating said ram, means for simultaneously applying fluid pressure to the driving means for said pattern and work holding means and said actuating means for the ram, and control means for the actuating means for said ram rendered effective by the forward movement of the ram to vary the rate of axial movement thereof in accordance with the configuration of the pattern and the work piece being machined, said last-mentioned control means being ineffective during the return movement of said ram to its rearward initial starting position.

10. A pattern controlled profiling machine having a frame, a rotatable pattern and work holding means mounted on said frame adapted to hold a cylindrical pattern and work having axially spaced portions to be profiled, a ram mounted on said frame for movement parallel to the axis of rotation of said pattern and work, a cutter spindle carrier mounted on said ram for movement radially of said axis of rotation of said pattern and work, a tracer mounted on said carrier, rotary cutting tool means on said carrier, said tracer being adapted to control said radial movements of said carrier relative to the work and pattern to effect profiling operations on peripheral cylindrical surfaces of the work, fluid pressure actuating means for said ram, control means for said last-mentioned fluid pressure actuating means to effect movement of said ram at different rates to rapidly bring said tracer and cutter to the portions to be profiled on the work while feeding said ram at lower rates of speed axially of the work while effecting profiling operations on the spaced portions to be machined on said work piece, and control means operable to initially position said tracer and rotary cutting tool means with respect to the pattern and work and for withdrawing the tracer and cutting tool from engagement therewith after the completion of said profiling operation.

11. In a pattern controlled milling machine having a column, rotatable pattern and work holding means mounted on said column, fluid pressure actuating means for rotating said pattern and work holding means, a ram mounted on said column for movement relative to said pattern and work holding means, a fluid pressure actuating means for moving said ram, control means for said fluid pressure actuating means, tracer controlled cutter spindle means on said ram arranged in operative association with a pattern and work in said rotatable holders, a variable rate control means effective during the forward movement of said ram to intermittently vary the rate of forward movement of said ram, said variable rate control means being effective at the completion of the forward movement of said ram to automatically render said second-mentioned control means ineffective while moving said first-mentioned control means to a position and holding it therein to maintain said pattern and work holding means in stopped position, and means whereby said second-mentioned control means may be operated to reverse the movement of said ram whereupon said first-mentioned control means is then rendered operative for effecting rotation of said pattern and work holding means.

12. In a pattern controlled milling machine having a column, rotatable pattern and work holding means on said column, fluid pressure means for rotating said holding means, a ram mounted on said column for movement relative to said pattern and work holding means, fluid pressure means for actuating said ram, fluid pressure control means for said actuating means, means whereby said second-mentioned control means for the ram is rendered effective for forward movements thereof when said first-mentioned control means is operated to effect rotation of said pattern and work and wherein said second-mentioned control means is inoperative to effect forward movement of said ram when said first-mentioned control means is positioned to stop rotation of said pattern and work holders, variable rate control means rendered effective by the movement of said ram in its forward direction to cause alternate operation of said ram at feed and rapid traverse movements, and means whereby said first-mentioned control means may be operated to initiate or stop rotation of said pattern and work holding means and the forward movement of said ram at feed or rapid traverse movements, the nature of the feed or rapid traverse movement stopped and started in the ram being determined by the relative position of the ram in its forward travel as controlled by said variable rate control means.

13. In a pattern controlled milling machine, a column, rotatable pattern and work holding means mounted on said column, a ram movable on said column relative to said holding means, tracer controlled rotary spindle carrying means on said ram operable in association with said rotary table holding means, control means for rendering said rotary pattern and work holding means operative or inoperative, control means for stopping or reversing the direction of movement of said ram, variable rate control means operable by the forward movement of said ram to change the relative rate of forward movement of said ram, means, whereby the operation of said first-mentioned control means to effect rotation of said pattern and work holding means, renders said second control means effective for stopping or initiating forward movements in said ram, the nature of the forward movement started or stopped by said second-mentioned control means being determined by said variable rate control means in accordance with the relative forward position of said ram, and means whereby said second-mentioned control means may be operated at any time to effect rapid rearward withdrawal movement of said ram.

14. In a profiling machine, the combination of a column, a rotatable pattern and work holding means on said column, a hydraulic motor for rotating said holding means, a ram movably mounted on said column, a cutter spindle carrier mounted on said ram, a tracer control means on said carrier, a fluid pressure actuating means for said ram, a fluid pressure actuating means for said carrier, a control means operable to stop or start rotation of said hydraulic motor, a second control means operable to effect movement of said actuating means for said ram in a forward or reverse direction, a third variable rate control means actuable by the movement of said ram to change the rate of forward movement of said ram, a source of high pressure low volume fluid pressure, a source of low pressure high volume fluid pressure, and means whereby said two sources of fluid pressure may be alternately applied to the ram actuating means by said variable rate control means in accordance with the movement of said ram in a forward direction, means whereby when said control means for the actuating means for the ram is positioned to effect forward movement thereof, said first-mentioned control means is effective to simultaneously stop or start pattern and work rotation and the forward movement of said ram at a rate of forward travel as determined by the condition of operation of said third-mentioned variable rate control means.

15. In a profiling machine, the combination of a column, a rotatable pattern and work holding means on said column, a hydraulic motor for rotating said holding means, a ram movably mounted on said column, a cutter spindle carrier mounted on said ram, a tracer control means on said carrier, a fluid pressure actuating means for said ram, a fluid pressure actuating means for said carrier, a control means operable to stop or start rotation of said hydraulic motor, a second control means operable to effect movement of said actuating means for said ram in a forward or reverse direction, a third variable rate control means actuable by the movement of said ram to change the rate of forward movement of said ram, a source of high pressure low volume fluid pressure, a source of low pressure high volume fluid pressure, and means whereby said two sources of fluid pressure may be alternately applied to the ram actuating means by said variable rate control means in accordance with the movement of said ram in a forward direction, means whereby when said control means for the actuating means for the ram is positioned to effect forward movement thereof, said first-mentioned control means is effective to simultaneously stop or start pattern and work rotation and the forward movement of said ram at a rate of forward travel as determined by the condition of operation of said third-mentioned variable rate control means, and means whereby said variable rate control means automatically moves said first-mentioned control means to a position to stop rotation of said hydraulic motor and locks said first-mentioned control means in said stop position when said ram has completed its forward movement.

16. In a profiling machine, the combination of a column, a rotatable pattern and work holding means on said column, a hydraulic motor for rotating said holding means, a ram movably mounted on said column, a cutter spindle carrier mounted on said ram, a tracer control means on said carrier, a fluid pressure actuating means for said ram, a fluid pressure actuating means for said carrier, a control means operable to stop or start rotation of said hydraulic motor, a second control means operable to effect movement of said actuating means for said ram in a forward or reverse direction, a third variable rate control means actuable by the movement of said ram to change the rate of forward movement of said ram, a source of high pressure low volume fluid pressure, a source of low pressure high volume fluid pressure, and means whereby said two sources of fluid pressure may be alternately applied to the ram actuating means by said variable rate control means in accordance with the movement of said ram in a forward direction, means whereby when said control means for the actuating means for the ram is positioned to effect forward movement thereof, said first-mentioned control means is effective to simultaneously stop or start pattern and work rotation and the forward movement of said ram at a rate of forward travel as determined by the condition of operation of said third-mentioned variable rate control means, and means whereby said second-mentioned control means may be operated at any time regardless of the relative position of said first-mentioned control means or said variable rate control means to rapidly withdraw said ram rearwardly.

17. In a pattern controlled machine tool having rotatable work and pattern supports, a tracer controlled tool and tracer support movable radially of the work and pattern supports and a ram for moving the tracer support parallel to the axis of the work, the combination of a control circuit including power operable means for rotating the work and pattern supports in synchronism, a control lever, means operable by the lever for starting and stopping said power operable means, a feed pump, a control line for said ram connectible by said means to the feed pump, serially arranged means in said line for starting and stopping the flow therein, an auxiliary source of fluid supply, and means trip controlled by said ram for intermittently connecting said auxiliary supply to said control line to vary the rate of movement of said ram.

18. In a pattern controlled machine tool having rotatable work and pattern supports, a tracer controlled tool and tracer support movable radially of the axis of rotation of the work and pattern supports and a ram for moving the tracer support parallel to said axis of rotation, the combination of a control circuit including a first source of pressure, valve means for coupling said pressure for synchronous rotation of the work and pattern supports, a ram control line, means in said valve means for coupling said control line to an auxiliary source of pressure to create a pressure flow in said control line, means serially arranged in said line for stopping and starting said flow, other means serially arranged in said line and intermittently operated by the ram to additively connect the first source of pressure to said line to increase the rate of ram movement, said last-named means also being operable to stop the flow from both sources of pressure to said ram.

WARREN WILDER.
HERMAN HORLACHER.

REFERENCES CITED

The following references are of record in the file of this patent:

UNITED STATES PATENTS

| Number | Name | Date |
|---|---|---|
| 468,283 | Guerrant | Feb. 2, 1892 |
| 1,008,593 | Fish | Nov. 10, 1911 |
| 2,068,890 | Sassen | Jan. 16, 1937 |
| 2,228,902 | Allen | Jan. 14, 1941 |
| 2,316,405 | Clausen | Apr. 13, 1943 |

FOREIGN PATENTS

| Number | Country | Date |
|---|---|---|
| 1,888 | Great Britain | Apr. 13, 1883 |